United States Patent

Kroy et al.

[15] 3,693,169

[45] Sept. 19, 1972

[54] THREE-DIMENSIONAL STORAGE SYSTEM

[72] Inventors: Walter Kroy; Sigmund Manhart, both of Munich; Walter Erich Mehnert, Ottobrunn, all of Germany

[73] Assignee: Messerschmitt-Bolkow-Blohm GmbH, Munich, Germany

[22] Filed: Nov. 2, 1970

[21] Appl. No.: 86,230

[30] Foreign Application Priority Data

Nov. 4, 1969 Germany..........P 19 55 364.1

[52] U.S. Cl..........340/173 R, 340/174 M, 340/166 R

[51] Int. Cl. ............................................G11c 13/00

[58] Field of Search .......340/173 R, 173 AM, 174 M

[56] References Cited

UNITED STATES PATENTS 3,355,721 11/1967 Burns ........................340/173

*Primary Examiner*—Terrell W. Fears

*Attorney*—Woodhams, Blanchard and Flynn

[57] ABSTRACT

Three-dimensional storage system wherein all storage positions are selectably accessible. An information storage system is provided having conductor paths arranged in three spatial directions. The electrically conductive junctions formed at each intersection of three mutually perpendicular conductor paths provide the respective storage positions. All conductor path systems which terminate in a common column at one exterior surface of the system and all conductor paths terminating in a common row each have a single common selecting line and two of these mutually perpendicular selecting lines respectively form an electronic gate which acts as a switch between the conductor path ends and the storage system. All ends of the conductor paths in the same plane lie at a one constant potential and the ends of the conductor paths in other planes lie at a different constant potential.

4 Claims, 3 Drawing Figures

Figure 1:
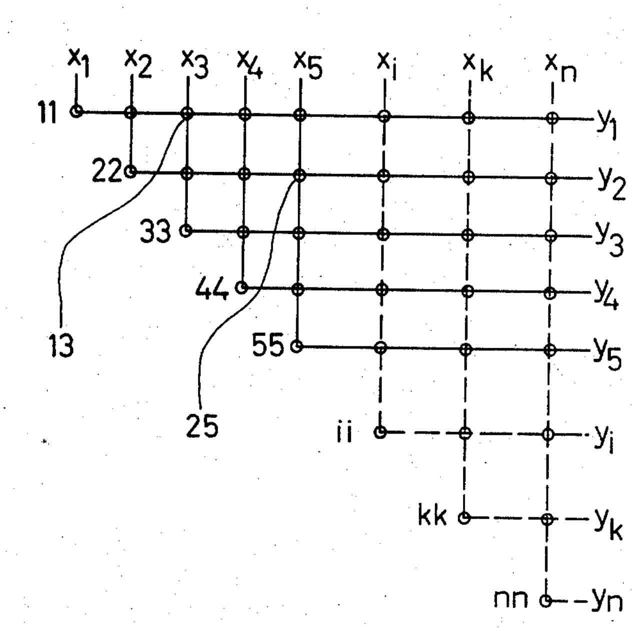

INVENTORS
WALTER KROY
SIGMUND MANHART
WALTER E. MEHNERT
BY
Woodhams, Blanchard and Flynn
ATTORNEYS INVENTORS
WALTER KROY
SIGMUND MANHART
WALTER E. MEHNERT
BY Woodhams Blanchard & Flynn
ATTORNEYS

THREE-DIMENSIONAL STORAGE SYSTEM

The invention relates to a three-dimensional storage system for storing large quantities of information, wherein the storage positions are all selectably accessible.

In prior art random access computer storage devices, e.g., in the central Processing units of computers, the storage elements are arranged in the form of matrices to simplify selection, i.e., the triggering of a required bit out of a large number thereof. The selection of one or more of the storage elements is performed by means of current or voltage-carrying X-rows and Y-columns.

The arrangement of the various storage elements also determines the number of lines leading into the storage device. In the case of a quadratic arrangement, the number of lines is proportional to $\sqrt{N}$, in the case of a cubic arrangement, to $\sqrt[3]{N}$, where N is the number of bits in the storage device. Because of the extremely great amount of wiring, storage devices wired in this way are used only as high-speed central processing units or as registers. However, mass storages having $10^7$ or more bits are today realized only in computer devices which do not permit selective access. Although the microfilm storages now producible by vapor deposition would provide, in a limited space, a quantity of selective access storage positions equal to that foreseen by the present invention, the external wiring of these elements would involve enormous, virtually insoluble, problems.

The object of the invention is to eliminate the described disadvantages and to provide a mass storage which permits selective access and whose volume and wiring requirements are considerably reduced from that of the systems otherwise presently known.

This task is solved by having conductor paths arranged in three spatial directions (X, Y, Z). The electrically conductive junction formed at each intersection of three mutually perpendicular conductor paths is the respective storage position.

In addition, it is provided that each position be selectable by only four selecting lines at one time.

An illustrative embodiment of the invention also provides that all conductor path systems which terminate in a common column at one of the exterior surfaces of the overall system and that all conductor path systems terminating in a common row each have a single, common selecting line and that two of these mutually perpendicular selecting lines, respectively form an electronic gate which acts as a switch between the conductor path ends and the storage system.

In addition, the invention provides that all ends of the conductor paths in the same plane lie at a constant potential and that the ends of the conductor paths in the other planes also lie at a constant potential, the value of which is different from the first potential, and that the electronic gates be designed as field effect transistors.

For a large storage device, the arrangement according to the invention considerably reduces the number of exterior wiring points, which results in a remarkable decrease in wiring and a great simplification of the whole system.

Figure 2:
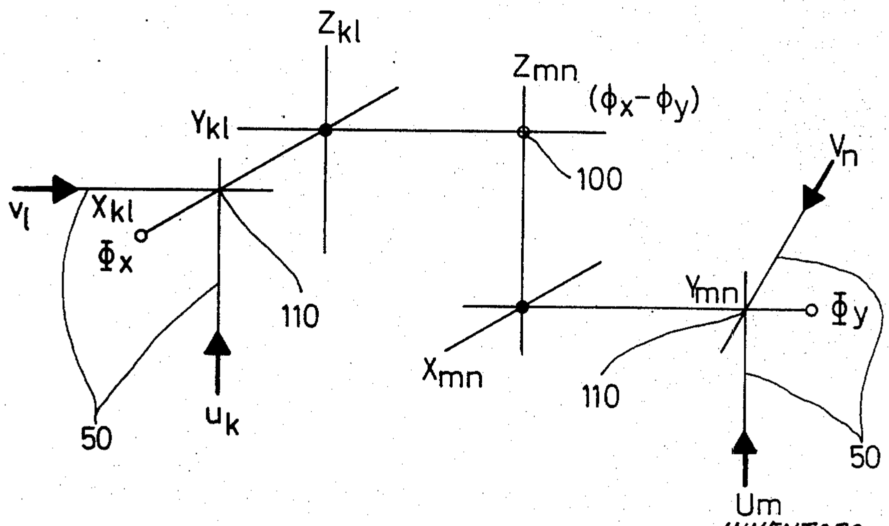
Figure 3:
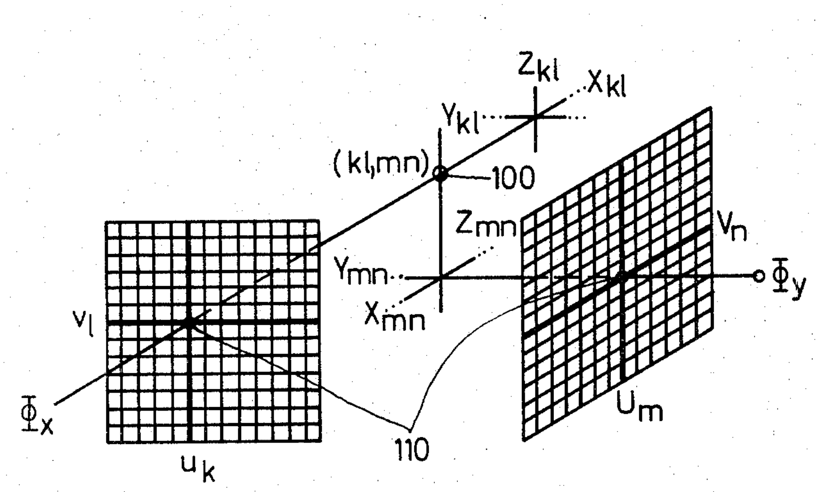

In the following, the invention is described and drawn so that further advantages and measures can be seen. The figures show:

FIG. 1 a schematic representation of a two-dimensional arrangement,

FIG. 2 a schematic representation of a part of the storage arrangement according to the invention in perspective view, FIG. 3 a schematic representation of the invention in perspective view with the selecting lines in the form of matrices.

The storage system according to the invention consists of a great many closely spaced conductor path systems $X_{kl}$, $Y_{kl}$, $Z_{kl}$ or $X_{mn}$, $Y_{mn}$, $Z_{mn}$, preferably vapor deposited and arranged in many layers, one above the other. The storage element, which is also preferably produced by vapor deposition, is located between the junctions 13, 25 etc. of the various conductor path systems. Numerous physical phenomena may be used as a transition between two conductors for storing information. As already mentioned, almost all active and passive electrical dipoles which can be used for a bistable circuit are suitable for the three-dimensional storage system provided by the invention.

In both two-dimensional and three-dimensional arrangements, every conductor path $X_1$, $X_2$. . .$X_n$ etc. can, in principle, be crossed by every other path, as illustrated in FIG. 1 for the two-dimensional arrangement. Conductor paths $X_1$ to $X_n$ are at a higher level than conductor paths $Y_1$ to $Y_n$. $X_1$ and $Y_1$ conductor paths are connected at point 11 so as to provide electrical conduction, $X_2$ and $Y_2$ conductor paths are connected at point 22, and so on. The storage positions are at the junctions of $X_1$ with the $U_k$ conductor paths, if $1 \neq k$. For example, storage position 25 is at the junction of $X_5$ and $Y_2$. If two different conductor paths are selected, e.g., $X_2$ and $X_5$, having different voltages, one can obtain the information stored at position 25. Utilizing this principle, all storage positions may be reached by varying two selected conductor paths $X_1$ and $X_k$, if $1 \neq k$.

In order to prevent the obtaining of erroneous information along the roundabout path via other storage positions, e.g., from line $X_2$ to line $X_5$ via positions 24, 14 and 15, each storage position must be provided with a blocking layer, which in every case blocks in one direction. The information is placed in the storage element by making the other transition direction high- or low-resistive.

This principle of crossing conductor paths is especially suitable for three-dimensional storage systems according to the invention.

Each conductor path system consists of three conductor paths $X_{kl}$, $Y_{kl}$ and $Z_{kl}$, which are in contact with each other (FIG. 2). Here again, every conductor path system can form a junction 100 together with every other, this junction being the storage position.

The requirements imposed upon such storage transitions are identical with those described for the two-dimensional system. The conductor paths lying one above the other, their points of contact and the storage elements are preferably produced by vapor deposition.

Above all, the three-dimensional arrangement, shown schematically in FIG. 2, results in a remarkable reduction in external wiring. For example, storage position 100 (*kl, mn*) is reached by selecting conductor paths $X_{kl}$ and $Y_{mn}$. According to the invention, all ends of conductor paths X or Y or Z are arranged in the form of matrices so that all conductor path ends lying in a common column or in a common row have common selecting lines 50 (FIGS. 2 and 3). Such an arrangement leads to a remarkable reduction in external wiring.

In the illustrative embodiment of the invention shown, all X-conductor ends are at a constant potential Φ X and all Y-conductor ends are also at a constant potential, which is, however, different from Φ X. These conductor ends are separated from the actual storage device by means of electric gates 110 which are preferably designed as field effect transistors.

By selecting two selecting lines $u_k$ and $v_l$, gate 110 of a conductor path is opened and the whole conductor path system $X_{kl}$, $Y_{kl}$, $Z_{kl}$ is thus at the outside potential Φ X. When, at the same time, another two selecting lines $U_m$ and $V_n$ are selected at another external level, another gate 110 is opened and the conductor path system $X_{mn}$, $Y_{mn}$, $Z_{mn}$ is at the other potential Φ Y. Since — as described above — every conductor path system has at least one junction 100 with every other conductor path system, voltage Φ X − Φ Y exists at this junction. The information at storage position 100 is now available by means of the resulting current signal.

The reduction in external wiring results from the face that in the device according to the invention each storage position 100 is reached by simultaneous selection of four selecting lines $u_k$, $v_l$, $U_m$, $V_n$. An exception is the simultaneous selection of $k = 1$ and $m = n$, because this would result in a short circuit. All other combinations of these four selecting lines result in a specific storage position.

The essential advantage of the arrangement according to the invention is that $\frac{1}{2} n^2 (n^2 - 1)$ storage positions can, in principle, be reached by the external wiring of four of $n$ selecting lines via $2n^2$ internal conductor path systems.

In contrast to conventional storages, where in the case of two-dimensional storages with N elements, external wiring is proportional to $\sqrt{N}$ and, for a three-dimensional storage, increases to $\sqrt[3]{N}$, external wiring for the device according to the invention is proportional to only $\sqrt[4]{N}$.

The embodiments of the invention in which an exclusive property or privilege is claimed are defined as follows:

1. A three dimensional storage system, comprising:

at least one first electrical conductor path means consisting of first, second and third intersecting electrical conductors arranged in three spatial directions and first normally closed electronic gate means connected at the junction of said electrical conductors, said electronic gate means being responsive to a first signal applied to said first and second ones of said electrical conductors to effect an opening of said first electronic gate means and a transmission of an information signal to said third electrical conductor;

at least one second electrical conductor path means consisting of fourth, fifth and sixth intersecting electrical conductors arranged in three spatial directions and second normally closed electronic gate means connected at the junction of said fourth, fifth and sixth electrical conductors, said electronic gate means being responsive to a second signal, different from said first signal, applied to said fourth and fifth ones of said electrical connectors to effect an opening of said electronic gate means and a transmission of an information signal to said sixth electrical conductor; and at least one information storage mans connected between said third and sixth electrical conductors, the information available in said storage means being represented by the resultant of said information signal through said third and sixth electrical conductors thereto.

2. The three dimensional storage system according to claim 1, wherein each of said first, second and third electrical conductors and each of said fourth, fifth and sixth electrical conductors are mutually perpendicularly arranged.

3. The three dimensional storage system according to claim 1, wherein the ends of said first and second electrical conductors and the ends of said fourth and fifth electrical conductors remote from said electronic gate means each terminate in separate, readily available, rows.

4. The three dimensional storage system according to claim 1, wherein said electronic gate means are field effect transistors.

* * * * *